United States Patent
Son

(10) Patent No.: US 9,853,582 B2
(45) Date of Patent: Dec. 26, 2017

(54) CONVERTER INTERCONNECTED WITH A WIND POWER GENERATION FARM TO ENABLE CONTINUOUS POWER TRANSMISSION AND OPERATING METHOD THEREOF

(71) Applicant: LSIS CO., LTD., Anyang-si, Gyeonggi-do (KR)

(72) Inventor: Gum Tae Son, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 47 days.

(21) Appl. No.: 14/690,172

(22) Filed: Apr. 17, 2015

(65) Prior Publication Data

US 2015/0333678 A1 Nov. 19, 2015

(30) Foreign Application Priority Data

May 14, 2014 (KR) .................. 10-2014-0058032

(51) Int. Cl.
*H02J 3/36* (2006.01)
*H02P 9/04* (2006.01)
*H02J 3/38* (2006.01)

(52) U.S. Cl.
CPC .............. *H02P 9/04* (2013.01); *H02J 3/36* (2013.01); *H02J 3/386* (2013.01); *Y02E 10/763* (2013.01); *Y02E 60/60* (2013.01)

(58) Field of Classification Search
CPC .... H02J 3/36; H02J 3/386; H02P 9/04; Y02E 10/763; Y02E 60/60
See application file for complete search history.

(56) References Cited

U.S. PATENT DOCUMENTS 6,420,796 B1 7/2002 Lagerwey
6,670,721 B2 * 12/2003 Lof .................... F03D 9/003
290/2

(Continued)

FOREIGN PATENT DOCUMENTS

CN 101479910 7/2009
CN 102801176 11/2012

(Continued)

OTHER PUBLICATIONS

Liang, et al., "Control of multi-terminal VSC-HVDC transmission for offshore wind power," 13th European Conference on Power Electronics and Applications, XP031541568, Sep. 2009, 10 pages.

(Continued)

*Primary Examiner* — Tulsidas C Patel
*Assistant Examiner* — S. Mikailoff
(74) *Attorney, Agent, or Firm* — Lee, Hong, Degerman, Kang & Waimey PC

(57) ABSTRACT

A converter and an operation method thereof are provided. A converter interconnected with a wind power generation farm includes a power monitor unit configured to detect a direct-current voltage of an entire system interconnected with the converter, a control unit configured to compare the detected direct-current voltage of the entire system with a reference voltage and adjust an alternating-current voltage that is supplied to the wind power generation farm to a preset value, and a switching unit configured to perform a switching operation based on the adjusted preset value to convert alternating-current power into direct-current power.

6 Claims, 8 Drawing Sheets

(56) References Cited

U.S. PATENT DOCUMENTS

| | | | |
|---|---|---|---|
| 8,035,240 B2* | 10/2011 | Erdman | H02P 9/007 290/44 |
| 8,305,778 B2 | 11/2012 | Jiang-Hafner | |
| 8,489,247 B1 | 7/2013 | Engler | |
| 8,631,275 B2* | 1/2014 | Opina, Jr. | H02J 3/386 290/44 |
| 8,796,884 B2 | 8/2014 | Naiknaware et al. | |
| 2007/0063677 A1 | 3/2007 | Schauder | |
| 2008/0304188 A1 | 12/2008 | Ichinose et al. | |
| 2009/0008937 A1* | 1/2009 | Erdman | H02P 9/105 290/44 |
| 2009/0008938 A1* | 1/2009 | Erdman | H02P 9/007 290/44 |
| 2010/0109328 A1 | 5/2010 | Li et al. | |
| 2010/0157632 A1 | 6/2010 | Batten et al. | |
| 2010/0198421 A1 | 8/2010 | Fahimi et al. | |
| 2011/0140438 A1 | 6/2011 | Delmerico et al. | |
| 2011/0248500 A1* | 10/2011 | Larsen | F03D 7/0272 290/44 |
| 2011/0273022 A1 | 11/2011 | Dennis et al. | |
| 2011/0291414 A1 | 12/2011 | Arinaga et al. | |
| 2012/0300510 A1* | 11/2012 | Jensen | H02J 3/36 363/35 |
| 2013/0015660 A1* | 1/2013 | Hesselbaek | H02J 3/16 290/44 |
| 2013/0270823 A1* | 10/2013 | Hannon | F03D 7/0284 290/44 |
| 2014/0049990 A1* | 2/2014 | Limpaecher | H02M 3/24 363/15 |
| 2015/0137520 A1* | 5/2015 | Garcia | H02J 3/1885 290/44 |
| 2015/0260161 A1* | 9/2015 | Son | F03D 7/06 290/44 |

FOREIGN PATENT DOCUMENTS

| | | |
|---|---|---|
| EP | 2528184 | 11/2012 |
| JP | 60-234425 | 11/1985 |
| JP | 2-114829 | 4/1990 |
| JP | 6-70500 | 9/1994 |
| JP | 11-50945 | 2/1999 |
| JP | 2001-339996 | 12/2001 |
| JP | 2004-194417 | 7/2004 |
| JP | 2004194417 | 7/2004 |
| JP | 2005-137163 | 5/2005 |
| JP | 2006-246661 | 9/2006 |
| JP | 2002-519588 | 7/2007 |
| JP | 2009-239990 | 10/2009 |
| JP | 2010-71156 | 4/2010 |
| JP | 2012-165615 | 8/2012 |
| JP | 5186039 | 1/2013 |
| JP | 2014-527791 | 10/2014 |
| KR | 10-2008-0016373 | 2/2008 |
| KR | 10-2011-0013978 | 2/2011 |
| WO | 2010/125687 | 11/2010 |
| WO | 2012/114467 | 8/2012 |

OTHER PUBLICATIONS

Feltes, et al., "Enhanced Fault Ride-Through Method for Wind Farms Connected to the Grid Through VSC-Based HVDC Transmission," IEEE Transactions on Power Systems, vol. 24, No. 3, Aug. 2009, XP011264397, p. 1537, 1539, 1541, 1543, 1545.
European Patent Office Application Serial No. 15165678.2, Search Report dated Nov. 26, 2015, 6 pages.
European Patent Office Application Serial No. 15159003.1, Search Report dated Jul. 20, 2015, 5 pages.
Japan Patent Office Application Serial No. 2015-020922, Office Action dated Mar. 1, 2016, 2 pages.
U.S. Appl. No. 14/589,806, Office Action dated Nov. 15, 2016, 17 pages.
Chinese Patent Application No. 201510246719.8, Office Action dated Jan. 4, 2017, 7 pages.

* cited by examiner

CONVERTER INTERCONNECTED WITH A WIND POWER GENERATION FARM TO ENABLE CONTINUOUS POWER TRANSMISSION AND OPERATING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0058032, filed on May 14, 2014, the contents of which are all hereby incorporated by reference herein in its entirety.

BACKGROUND

The present disclosure relates to a converter and an operating method thereof, and particularly, to a converter interconnected with a wind power generation farm and an operating method thereof.

In general, high voltage direct current (hereinafter, referred to as "HVDC") refers to a high-voltage direct-current electric power transmission system, in which alternating-current power that is produced in a power plant is converted into direct-current power and then transmitted; and the converted direct-current power is converted back into the alternating-current power in a power reception region and then supplied.

HVDC is being widely and globally used in various applications from high-voltage electric power transmission to electric power distribution because of its high power transmission efficiency and low power loss.

Recently, HVDC has been recognized as an essential technique for reducing greenhouse gases and expanding the supply of new renewable energy, such as wind force and sunlight, and thus there has been an increased interest in HVDC.

In addition, HVDC has a high impact on related fields such as semiconductor power electronics, computer, control, communication, electricity, machine design, and interpretation engineering and thus has been recognized as a core technique in the power industry field on the national level.

Such a HVDC system is classified into a current-type HVDC system using a thyristor valve and a voltage-type HVDC system using an IGBT device.

The voltage-type HVDC is appropriate for a small isolated system requiring no separate power source since the voltage-type HVDC can supply reactive power as well as active power. In addition, the voltage-type HVDC is also appropriate for an offshore platform having no alternating-current power source since the voltage-type HVDC has a small area for a power conversion station and is capable of implementing a black start function.

Solutions or projects for interconnecting a large and remote new renewable energy generation farm using the voltage-type HVDC are increasingly emerging due to the above-mentioned advantages of the voltage-type HVDC.

When an alternating-current system is configured to be interconnected with a wind power generation farm, a general multi-terminal direct-current transmission apparatus is controlled by a remote control device 200.

This will be described with reference to FIG. 1.

FIG. 1 is a block diagram showing a general multi-terminal direct-current transmission apparatus.

The multi-terminal direct-current transmission apparatus of FIG. 1 is a system having four terminals, each of which is interconnected with an alternating-current system or a wind power generation farm 300 that is connected with an electric transformer 400.

There is an impedance (R+jωL) of an electric wire and an impedance of a power grid between the converter 100 and the alternating-current system.

Each terminal includes the converter 100 and is controlled by a remote control device 200.

The remote control device 200 is separated from each converter 100, and thus may control each converter 100 through communication.

When the remote control device 200 is unable to control each converter 100 due to communication failure between each converter 100 and the remote control device 200 and one or more converters 100 does not work normally, each converter 100 operates in a backup operating mode.

Thus, each converter 100 starts operating a backup controller such as a droop controller to assist an entire direct-current transmission system in continuously transmitting power.

However, when communication between the converter 100 and the wind power generation farm 300 is impossible, the converter interconnected with a wind power generator may not perform power transmission control normally.

This is because a general wind power generator is controlled through a maximum power point tracking (MPPT) scheme, excessive power is supplied to the entire direct-current transmission apparatus, and thus a common direct-current bus voltage of a multi-terminal direct-current transmission apparatus increases to make it difficult for the direct-current transmission apparatus to be continuously operated.

In addition, when a magnitude of output alternating-current power of the converter 100 is changed to correspond to a magnitude of a direct-current voltage of the entire system, inrush current may be generated in the wind power generation farm 300 interconnected with the converter 100.

Furthermore, the generated inrush current may damage devices in the power system.

SUMMARY

Embodiments provide a converter that enables continuous power transmission of a direct-current transmission apparatus interconnected with a wind power generation farm and prevents generation of an inrush current, and an operating method thereof.

In one embodiment, a converter interconnected with a wind power generation farm includes: a power monitor unit configured to detect a direct-current voltage of an entire system interconnected with the converter; a control unit configured to compare the detected direct-current voltage of the entire system with a reference voltage and adjust an alternating-current voltage that is supplied to the wind power generation farm to a preset value, when it is determined as a result of the comparison that the detected direct-current voltage of the entire system is out of a preset range of the reference voltage; and a switching unit configured to perform a switching operation based on the adjusted preset value to convert alternating-current power into direct-current power, in which the control unit controls a magnitude of the alternating-current voltage to increase at a preset rate when the direct-current voltage of the entire system falls within the preset range after the control unit adjusts the alternating-current voltage to the preset value.

The power monitor unit may measure an alternating current of an alternating-current system between the converter and the wind power generation farm, and the control unit may determine whether a variation in the measured alternating current is equal to or greater than a preset variation.

The control unit may include a frequency control unit configured to allow a frequency of the alternating-current voltage to increase at a preset rate when the variation in the measured alternating current is equal to or greater than the preset variation.

The control unit may include an operation control unit configured to control a switching operation of the switching unit based on the frequency of the alternating-current voltage that increases at the preset rate.

The converter may further include a protection unit configured to block an overcurrent having a magnitude equal to or greater than a preset magnitude from flowing to the converter.

The preset value of the converter interconnected with the wind power generation farm according to embodiments may include a frequency and a magnitude of the alternating-current voltage.

The control unit may adjust the alternating-current voltage to the preset value to lower the frequency and the magnitude of the alternating-current voltage that is supplied to the wind power generation farm and reduce an amount of power generation of the wind power generation farm that is supplied with the adjusted alternating-current voltage.

The control unit may include: a comparison unit configured to compare the detected direct-current voltage of the entire system with the reference voltage; a frequency control unit configured to adjust a frequency of the alternating voltage to the preset value depending on a result of the comparison; a voltage magnitude control unit configured to adjust a magnitude of the alternating-current voltage based on the adjusted frequency of the alternating-current voltage; a phase control unit configured to adjust a phase of the alternating-current voltage based on the adjusted frequency of the alternating-current voltage; and an operation control unit configured to control the switching unit based on either the adjusted magnitude or phase of the alternating-current voltage or both thereof.

The voltage magnitude control unit may adjust the magnitude of the alternating-current voltage to a magnitude of an alternating-current voltage corresponding to the adjusted frequency of the alternating-current voltage according to a constant V/f control scheme.

The details of one or more embodiments are set forth in the accompanying drawings and the description below. Other features will be apparent from the description and drawings, and from the claims.

DETAILED DESCRIPTION OF THE EMBODIMENTS

Figure 1:
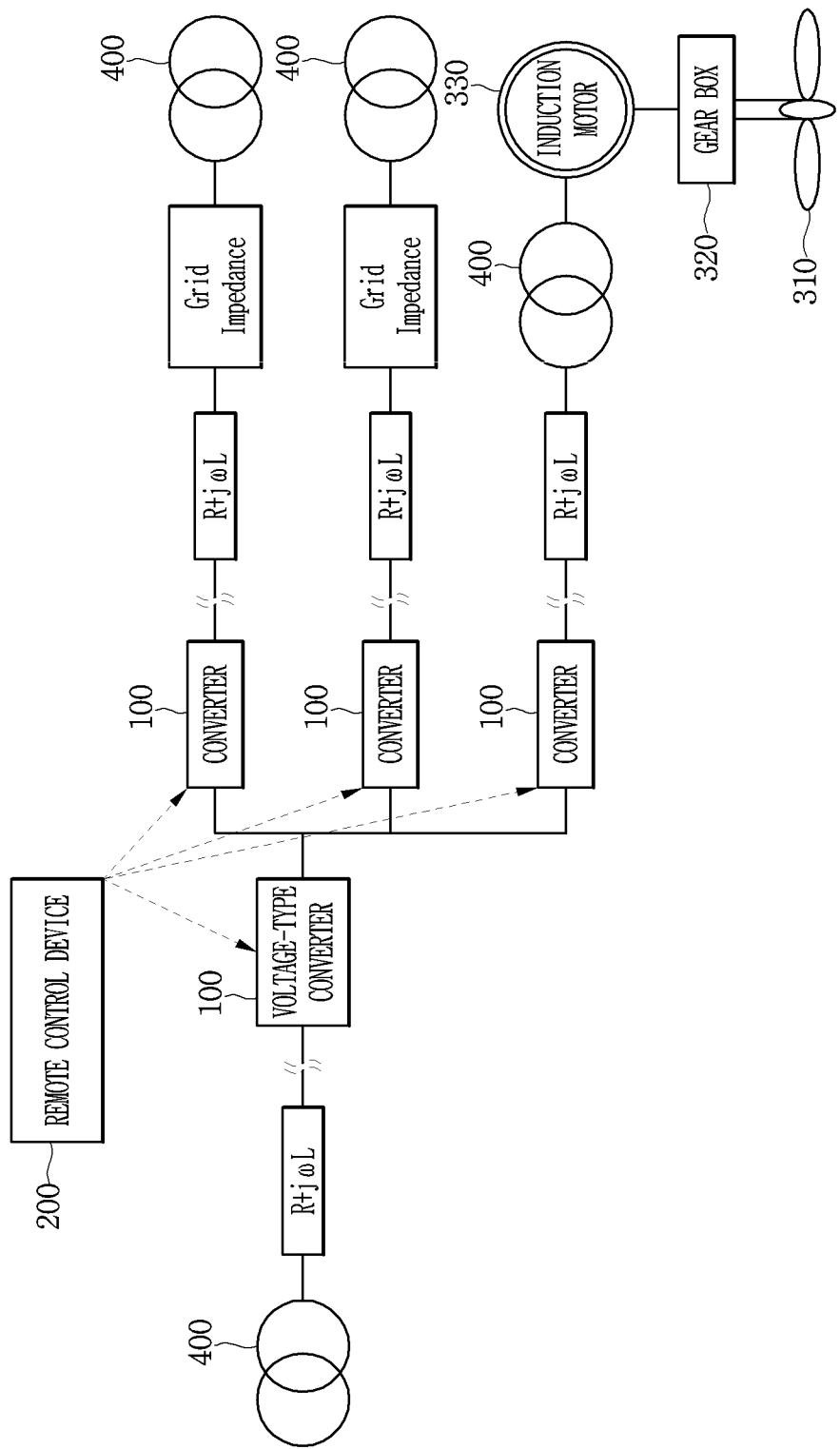
FIG. 1 is a block diagram showing a general multi-terminal direct-current transmission apparatus.

Hereinafter, exemplary embodiments will be fully described with reference to the accompanying drawings in such a way those skilled in the art would easily carry out the embodiments. However, the described embodiments may be modified in various different ways, all without departing from the spirit or scope of the present invention. In the accompanying drawings, a portion irrelevant to a description of the present invention will be omitted for clarity. Moreover, like reference numerals refer to like elements throughout.

Furthermore, when one part is referred to as "comprising (or including or having)" other elements, it should be understood that it may comprise (or include or have) only those elements, or other elements as well as those elements unless specifically indicated to the contrary.

A basic operation of a wind power generation farm 300 will be described with reference to FIG. 2 prior to description for a converter and the operating method thereof according to an embodiment.

Figure 2:
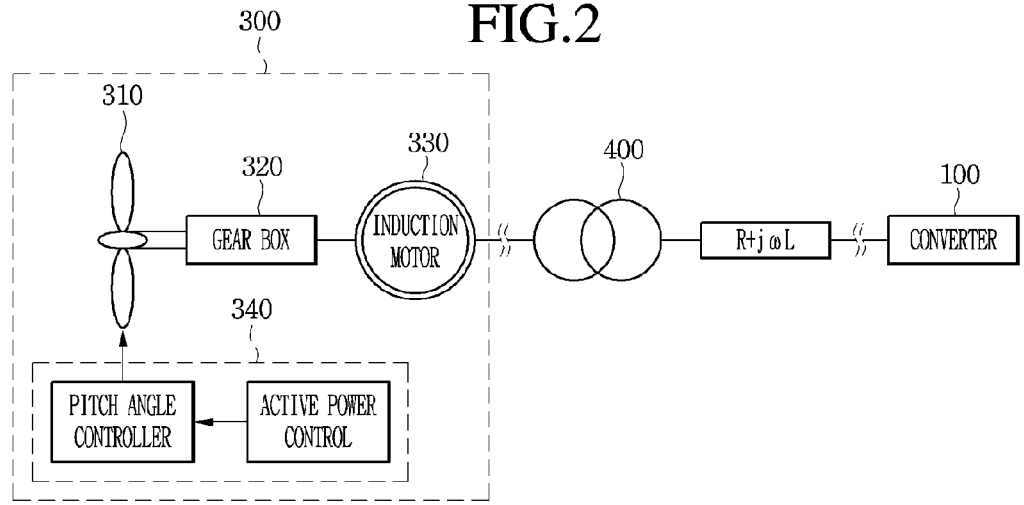
FIG. 2 shows a wind power generation farm interconnected with a converter.

FIG. 2 shows the wind power generation farm 300 interconnected with the converter 100.

The converter 100 is interconnected with the wind power generation farm 300 through an electric transformer 400. There is an impedance R+jωL of an electric wire between the converter 100 and the electric transformer 400.

FIG. 2 depicts an example of a wind power generator, discussed further below, of the wind power generation farm 300. However, this disclosure includes embodiments wherein the wind power generation farm 300 includes a plurality of wind power generators.

Each wind power generator includes a blade 310, a gear box 320, an induction motor 330, and a control unit 340.

The blade 310 may obtain rotational force from the wind.

The gearbox 320 converts a rotation speed of the blade 310 into an appropriate speed.

The induction motor 330 induces electricity according to the rotation of the blade 310.

The control unit 340 controls an overall operation of the wind power generator.

The control unit 340 may control wind power generating operations through various methods.

For example, in a method for controlling a pitch angle, the control unit 340 may control the wind power generating operations through the control of active power in response to a command of power amount.

When an alternating-current voltage of an alternating-current system interconnected with the wind power generator has a fixed frequency and magnitude, power of wind force is calculated using Equation 1 below:

$$P_{turbine} = C_p P_{wind} = \frac{1}{2} C_p \rho A v^3 \qquad (1)$$

where Cp is an output coefficient, which may be converted through the control of a pitch angle.

The frequency and magnitude of the alternating-current voltage affect the active power due to such characteristics.

This will be described with reference to FIG. 3.

Figure 3:
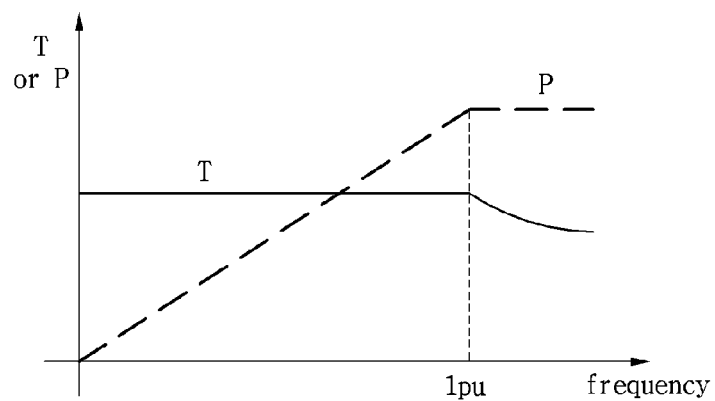
FIG. 3 is a graph showing a constant V/f control characteristic curve of a general induction motor.

FIG. 3 is a graph showing a constant V/f control characteristic curve of a general induction motor.

Here, V/f is a ratio of voltage to frequency.

In the characteristic curve of FIG. 3, the X-axis indicates a frequency value that is proportional to a rated frequency, and the Y-axis is a value of torque (T) or power (P) according to the constant V/f control.

As shown in FIG. 3, the power (P) of the induction motor is constant when the frequency is higher than 1 pu; and when the frequency is lower than 1 pu, the torque (T) maintain constant and thus the power (P) of the induction motor decreases as the frequency decreases.

Such characteristics of general induction motors are well known, and thus detailed description therefor will not be provided herein.

The converter 100 and the operating method thereof according to an embodiment will be described below with reference to the above description.

The converter 100 according to an embodiment will be described with reference to FIGS. 4 and 5.

Figure 4:
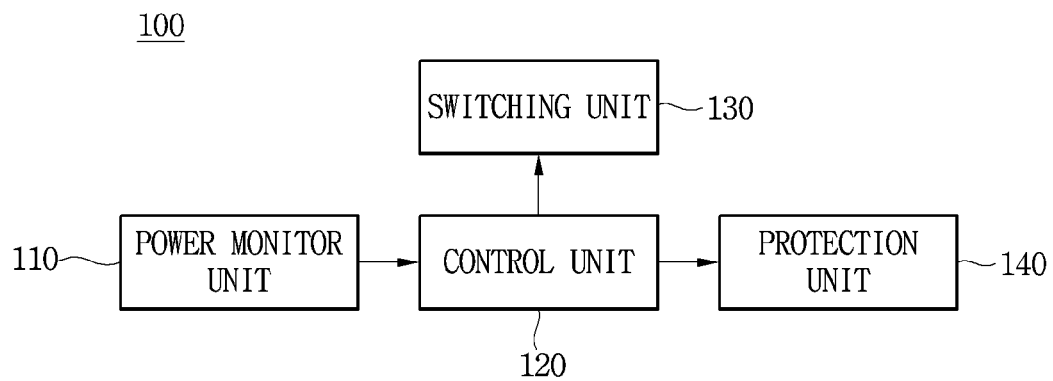
FIG. 4 is a block diagram showing a configuration of a converter according to an embodiment.

FIG. 4 is a block diagram showing a configuration of the converter 100.

Figure 5:
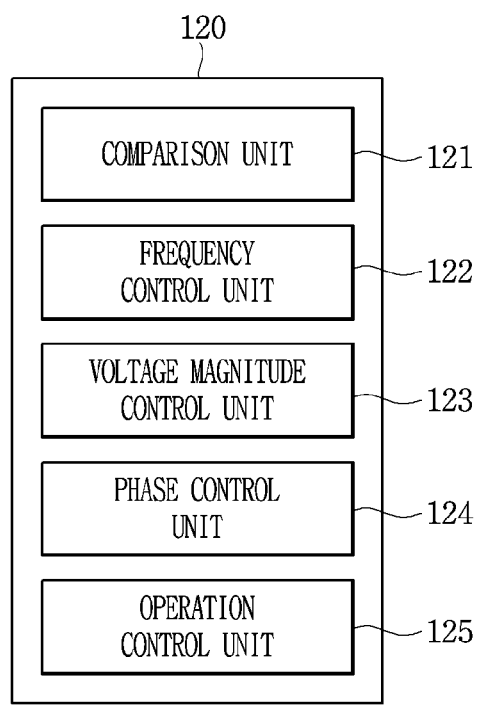
FIG. 5 is a block diagram showing a configuration of a control unit according to an embodiment.

FIG. 5 is a block diagram showing a configuration of a control unit 120 of the converter 100.

The converter 100 converts alternating-current power into direct-current power or converts direct-current power into alternating-current power.

The converter 100 includes a power monitor unit 110, a control unit 120, a switching unit 130, and a protection unit 140.

The power monitor unit 110 measures one or both of a direct-current voltage of an entire system interconnected with the converter 100 and an alternating current of an alternating-current system between the converter 100 and the wind power generation farm 300.

The power monitor unit 110 transfers, to the control unit 120, the measured one or both of the direct-current voltage of the entire system and the alternating current of the alternating-current system.

The control unit 120 controls an overall operation of the converter 100.

Specifically, the control unit 120 may control a conversion operation between direct-current power and alternating-current power that is performed by the converter 100.

For example, the control unit 120 may perform control such that at least one selected from a magnitude of a direct-current voltage, a frequency of an alternating-current voltage, a magnitude of an alternating-current voltage, and a phase of an alternating-current voltage is adjusted, when the conversion operation between direct-current power and alternating-current power is performed by the converter 100.

Thus, the control unit 120 may perform control such that at least one selected from a magnitude of a direct-current voltage, a frequency of an alternating-current voltage, a magnitude of an alternating-current voltage, and a phase of an alternating-current voltage is adjusted to a specific control value, when the conversion operation between direct-current power and alternating-current power is performed by the converter 100.

In addition, the control unit 120 may receive a control signal of the remote control device 200 through communication.

Specifically, the control unit 120 includes a comparison unit 121, a frequency control unit 122, a voltage magnitude control unit 123, a phase control unit 124, and an operation control unit 125.

The comparison unit 121 compares the measured direct-current voltage of the entire system with a reference voltage.

In addition, the comparison unit 121 may determine through comparison whether a variation in the measured alternating current of the alternating-current system is equal to or greater than a reference variation.

The frequency control unit 122 adjusts the frequency of the alternating-current voltage through the comparison between the measured direct-current voltage of the entire system and the reference voltage by the comparison unit 121, and transmits a frequency control signal.

The voltage magnitude control unit 123 calculates the magnitude of the alternating-current voltage corresponding to the control signal of the frequency control unit 122 and adjusts the magnitude of the alternating-current voltage that is output by the converter, to the calculated magnitude of the alternating-current voltage.

In response to the control signal of the frequency control unit 122, the phase control unit 124 adjusts the phase of the alternating-current voltage that is output by the converter 100.

The operation control unit 125 may control an operation of the switching unit 130 based on either the magnitude or phase of the calculated alternating-current voltage or both thereof.

The switching unit 130 may convert alternating-current power into direct-current power or convert direct-current power into alternating-current power through a switching operation.

Specifically, the switching unit 130 may include a power semiconductor device, and convert alternating-current power into direct-current power or convert direct-current power into alternating-current power through the included power semiconductor device.

For example, the switching unit 130 converts a direct current into an alternating current or converts an alternating current into a direct current by using an insulated gate bipolar transistor (IGBT).

Specifically, a direct current may be converted into an alternating current, or an alternating current may be converted into a direct current through a switching operation of the IGBT included in the switching unit 130.

The protection unit 140 may prevent overcurrent from flowing to the converter 100.

Specifically, the protection unit 140 may include a resistor and prevent overcurrent of which a magnitude is equal to or greater than a preset magnitude from being applied to the converter 100.

An operating method of the converter 100 will be described with reference to FIG. 6.

Figure 6:
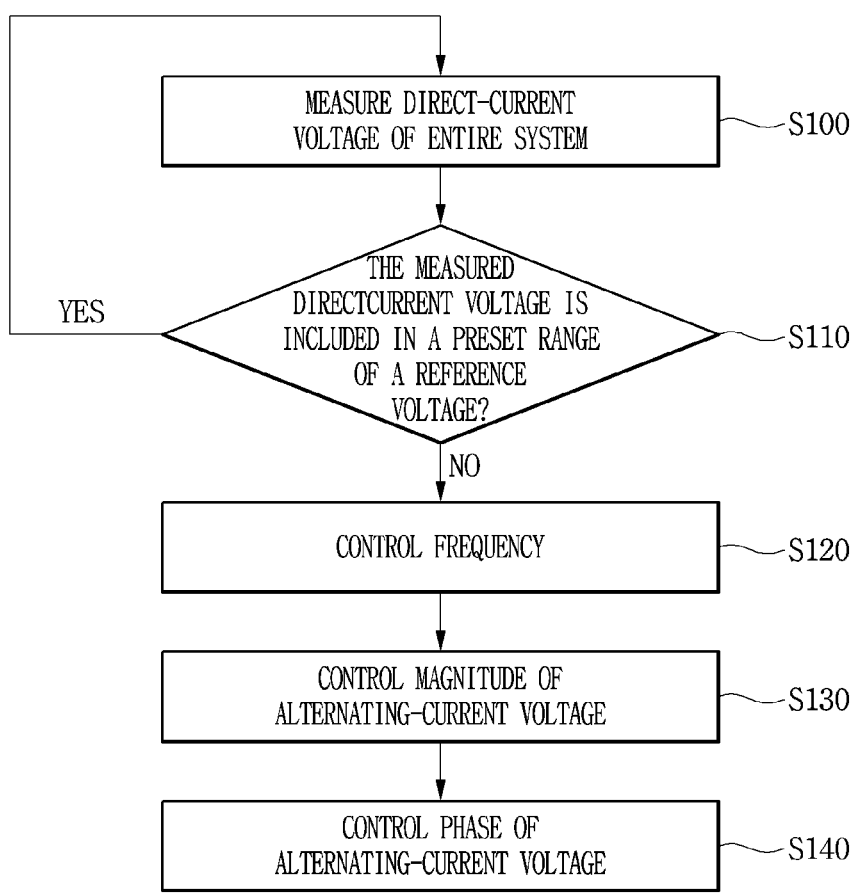
FIG. 6 is a flowchart showing an operating method of a converter according to an embodiment.

FIG. 6 is a flowchart showing the operating method of the converter 100.

The power monitor unit 110 measures a direct-current voltage of an entire interconnection system (S100).

The direct-current voltage of the entire system that is measured by the power monitor unit 110 is transferred to the control unit 120.

The control unit 120 of the converter 100 determines whether the measured direct-current voltage is included in a preset range of the reference voltage.

The comparison unit 121 of the control unit 120 may compare the measured direct-current voltage with the reference voltage and determine whether the measured direct-current voltage is included in the preset range of the reference voltage.

For example, if the reference voltage is 1000V and the preset range is from 900V to 1100V, the comparison unit 121 may determine that the reference voltage is included in the preset range when the measured direct-current voltage is 950V. However, when the measured direct-current voltage is 1300 V, the comparison unit 121 may determine that the measured direct-current voltage is not included in the preset range of the reference voltage.

Here, the reference voltage and the preset range of the reference voltage may be set variously depending on a configuration, a design, and an operation of the entire system.

The control unit 120 may determine whether the direct-current voltage that is measured by the power monitor unit 110 is included in the preset range of the reference voltage, when the control signal of the remote control device 200 is not transferred to the converter 100 due to communication failure or communication error between the remote control device 200 and the converter 100.

When the direct-current voltage is not included in the preset range of the reference voltage, the control unit 120 adjusts a frequency of the alternating-current voltage output by the converter to a preset value (S120).

For example, when the direct-current voltage of the entire interconnection system is not included in the reference voltage, and the converter 100 is unable to receive the control signal of the remote control device 200, the control unit 120 may perform control such that the converter 100 reduces, to a preset value, the alternating-current voltage which is supplied to the wind power generation farm 300.

Here, the preset value may be set variously depending on a configuration, a design, and an operation of the entire system.

This will be described with reference to FIG. 7.

Figure 7:
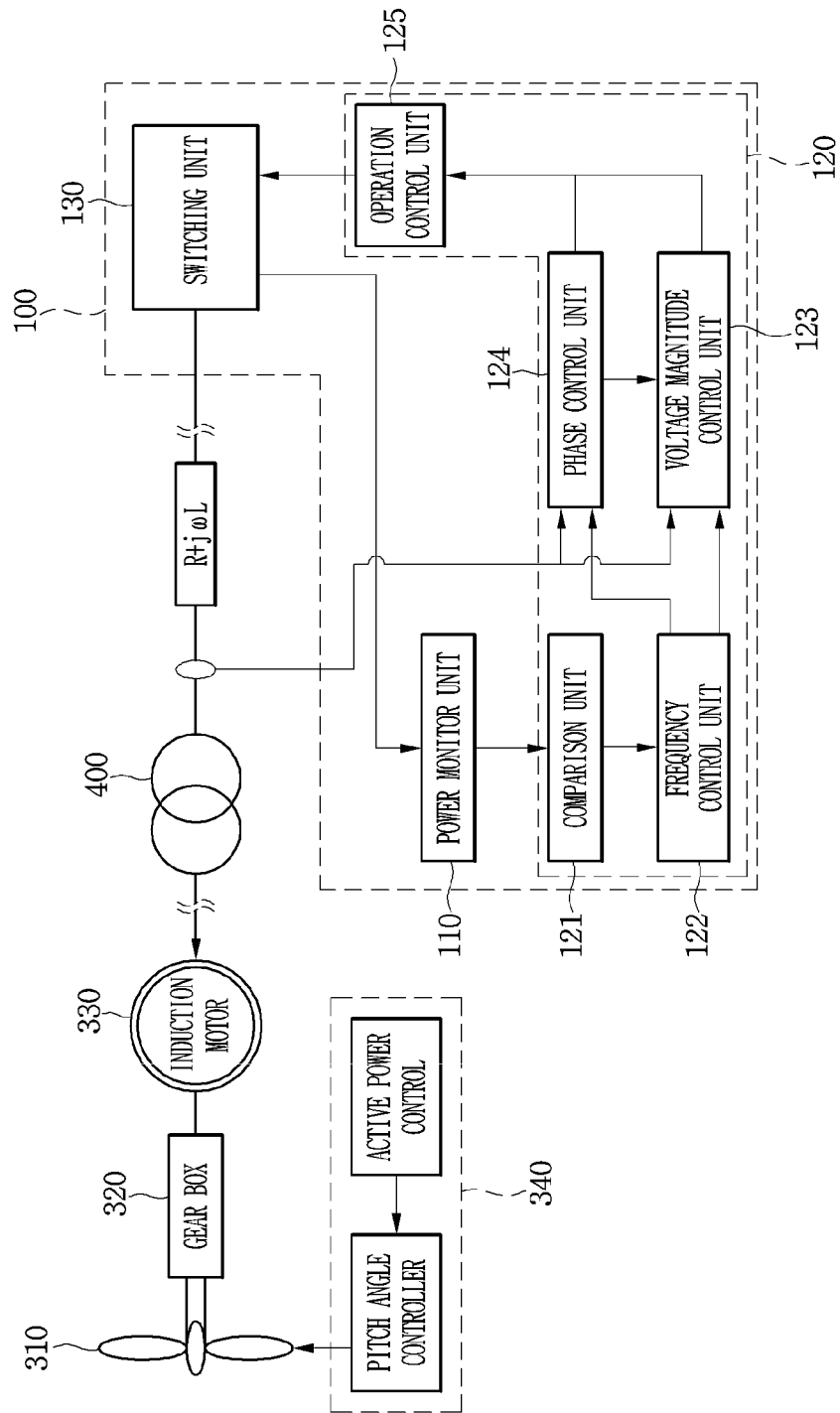
FIGS. 7 and 8 are conceptual views showing operations of a converter according to an embodiment.

FIG. 7 is a conceptual view showing the operating method of the converter 100.

As shown in FIG. 7, the power monitor unit 110 of the converter 100 measures a direct-current voltage of the entire system.

Subsequently, the comparison unit 121 compares the measured direct-current voltage of the entire system with a reference voltage and determines whether the measured direct-current voltage of the entire system is equal to or less than the reference voltage.

As a comparison result of the comparison unit 121, if the measured direct-current voltage of the entire system is not equal to or less than the reference voltage, the frequency control unit 122 adjusts the frequency of the output alternating-current voltage of the converter 100 to a preset value and transmits a frequency control signal for a frequency to be adjusted, which is the preset value.

The frequency control signal transmitted by the frequency control unit 122 may also include information on the preset value, which is the frequency value of the alternating-current frequency to be adjusted.

Accordingly, when the frequency control unit 122 transmits the frequency control signal that controls the frequency of the alternating-current voltage to be lowered, the frequency control signal may also include the frequency of the alternating-current voltage to be adjusted.

The frequency control signal transmitted by the frequency control unit 122 is transferred to the voltage magnitude control unit 123 and the phase control unit 124.

In an embodiment, the frequency control unit 122 may perform control such that the frequency of the output alternating-current voltage of the converter 100 is lowered from 60 Hz to the preset value of 30 Hz, and may transmit a frequency control signal allowing the frequency of the output alternating-current voltage to be lowered to 30 Hz.

A degree of the frequency of the alternating-current voltage lowered by the frequency control unit 122 may be set variously depending on the measured magnitude of the direct-current voltage of the entire system and the configuration, design, operation of the entire system.

The control unit 120 returns to operation S100 when it is determined in operation S110 that the measured direct-current voltage is included in a preset range of the reference voltage.

The operating method of the converter 100 will be subsequently described by referring again to FIG. 6.

The control unit 120 adjusts the magnitude of the output alternating-current voltage of the converter 100 to the magnitude of the alternating-current voltage corresponding to the adjusted frequency (S130).

The voltage magnitude control unit 123 may use a constant V/f control scheme that has little influence on insulation of an electric transformer that is interconnected to the converter 100 and the induction motor 330 of the wind power generator included in the wind power generation farm 300.

Thus, the voltage magnitude control unit 123 of the control unit 120 may adjust the magnitude of the output alternating-current voltage of the converter 100 according to the frequency control signal transmitted in S120.

For example, in the case where the magnitude and frequency of the output alternating-current voltage before the frequency adjustment are 220V and 60 Hz, respectively, the voltage magnitude control unit 123 may control the converter 100 such that the magnitude of the output alternating-current voltage may be adjusted to 110V, when the adjusted frequency of the output alternating-current voltage is 30 Hz.

The voltage magnitude control unit 123 may control the magnitude of the output alternating-current voltage using a proportional integral control scheme on the basis of the magnitude of the alternating-current voltage being currently measured and the magnitude of the alternating-current voltage to be adjusted.

Accordingly, the voltage magnitude control unit 123 may perform control such that the magnitude of the alternating-current voltage being currently measured may approach the magnitude of the alternating-current voltage to be adjusted, through feedback control by which the magnitude of the alternating-current voltage being currently measured is compared with the magnitude of the alternating-current voltage to be adjusted and then adjusted.

Meanwhile, since the proportional integral control is a well-known technique, and the voltage magnitude adjustment through the proportional integral control is also a well-known technique, detailed descriptions therefor will not be provided herein.

The control unit 120 adjusts the phase of the output alternating-current voltage of the converter 100 to a phase of an alternating-current voltage corresponding to the adjusted frequency (S140).

The converter 100 also serves as an inverter, and thus the control unit 120 may control the phase of the output alternating-current voltage of the converter 100.

Accordingly, the phase control unit 124 of the control unit 120 may adjust the phase of the output alternating-current voltage on the basis of the phase of the current alternating-current voltage and the phase of the alternating-current voltage corresponding to the alternating-current voltage to be adjusted, according to the frequency control signal.

The phase control unit 124 may calculate the phase of the output alternating-current voltage of the converter 100 based on the frequency of the adjusted alternating-current voltage and may adjust the phase of alternating-current voltage to the calculated phase of the alternating-current voltage on the basis of the phase angle of the currently output alternating-current voltage.

Through the above-described process, the control unit 120 may perform control such that the converter 100 outputs the alternating-current voltage having the adjusted magnitude and frequency of the voltage.

Thus, the wind power generation farm 300 interconnected with the converter 100 receives the alternating-current voltage having the adjusted frequency and magnitude.

For example, the wind power generation farm 300 may receive an alternating-current voltage having a frequency and a magnitude lower than those before adjusted, and thus a torque (T) of the induction motor 330 is constant according to a characteristic curve of the induction motor 330 shown in FIG. 2, but an amount of power (P) generated by the wind power generation farm 300 decreases.

The wind power generation farm 300 interconnected with a multi-terminal type direct-current transmission apparatus may be prevented from supplying excessive power to the entire direct-current system.

Accordingly, even when communication failure between the converter 100 and the remote control device 200 and an error in the alternating system occur, the multi-terminal type direct-current transmission apparatus may operate normally.

Here, it has already been described with reference to FIGS. 2 and 3 that the torque (T) of the wind power generator of the wind power generation farm 300 is constant, but the generated amount of power (P) is reduced.

Next, an embodiment of the operating method of the converter 100 will be described with reference to FIG. 8.

Figure 8:
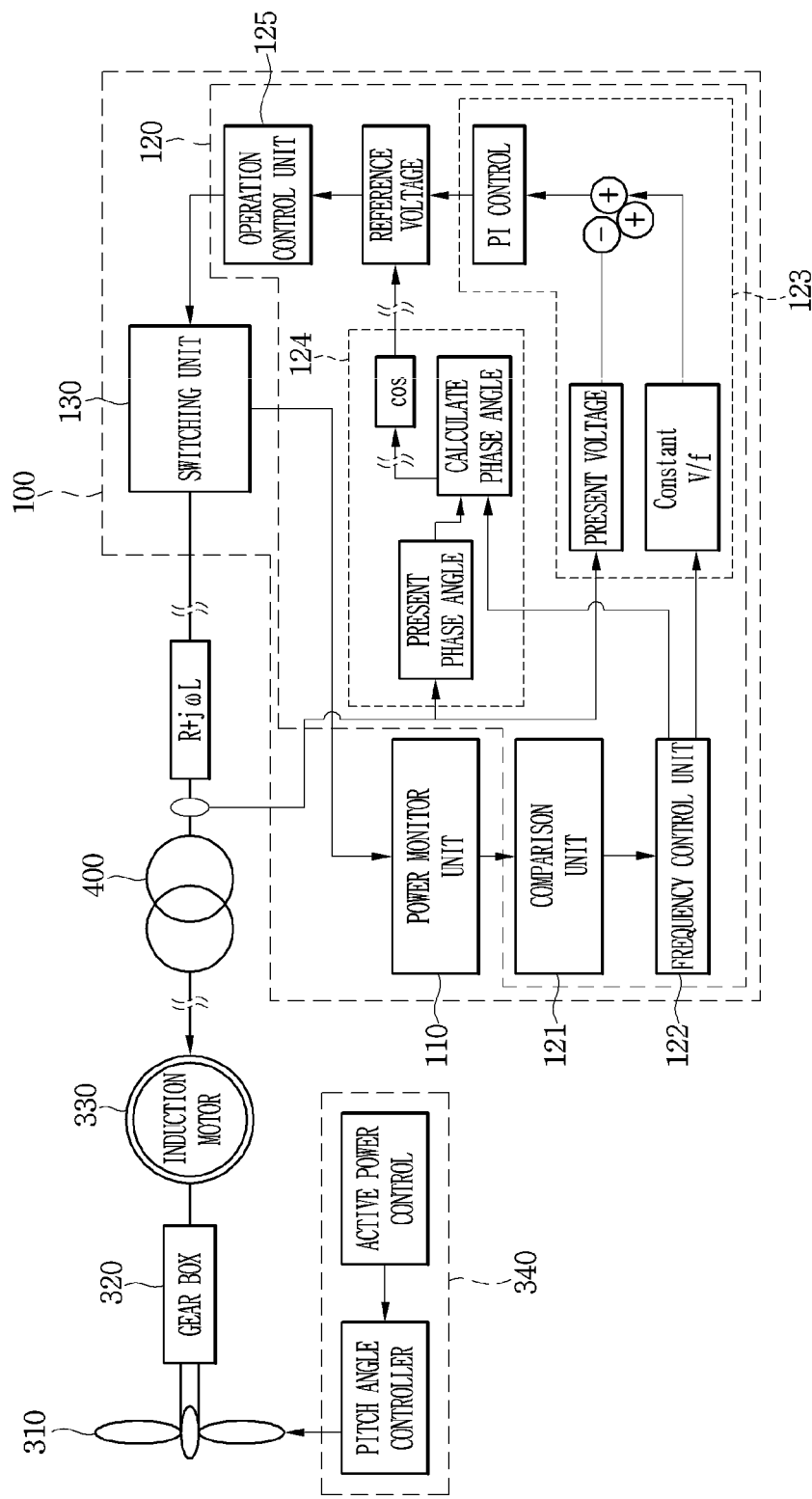

FIG. 8 is a conceptual view showing an operation of the converter 100, which shows an operation of control unit 120 in detail.

As shown in FIG. 8, the power monitor unit 110 measures a direct-current voltage of the entire system.

Subsequently, the comparison unit 121 compares the measured direct-current voltage of the entire system with a reference voltage and determines whether the measured direct-current voltage of the entire system is equal to or less than the reference voltage.

As a result of comparison of the comparison unit 121, when it is determined that the measured direct-current voltage of the entire system is not equal to or less than the reference voltage, the frequency control unit 122 adjusts the frequency of the output alternating-current voltage of the converter 100 to a preset value.

The frequency control unit 122 transfers a frequency control signal to the voltage magnitude control unit 123 and the phase control unit 124.

Thus, the voltage magnitude control unit 123 of the control unit 120 may adjust the magnitude of the output alternating-current voltage of the converter 100 according to the received the frequency control signal.

Specifically, the voltage magnitude control unit 123 calculates the magnitude of the alternating-current voltage corresponding to the magnitude of the frequency to be adjusted according to the constant V/f control scheme.

The voltage magnitude control unit 123 adjusts the current magnitude of the alternating-current voltage to the calculated magnitude of the alternating-current voltage through the proportional integral control scheme.

A signal for the voltage magnitude control unit 123 to control the magnitude of the output alternating-current voltage to the calculated magnitude of the alternating-current voltage is transferred to the operation control unit 125.

Subsequently, the operation control unit 125 transfers a signal having the form of a reference voltage to the switching unit 130.

The reference voltage may be a control signal that is transferred to the switching unit 130 and may be represented as $m \cos(2\pi f+\phi)$.

Here, m is a magnitude (modulation index) of the output alternating-current voltage of the converter 100, and $2\pi f+\phi$ is a phase of the output alternating-current voltage.

Upon receiving the signal for the reference voltage, the switching unit 130 may output an output alternating-current voltage corresponding to the reference voltage through a switching operation.

Here, the reference voltage may be transferred to the switching unit 140 through various methods such as a pulse width modulation (PWM) and a modular multi-level converter (MMC) control.

The phase control unit 124 may adjust the phase of the output alternating-current voltage to the phase of the alternating-current voltage corresponding to the received frequency control signal on the basis of the phase angle of the alternating-current voltage being currently measured.

Specifically, the phase control unit 124 may calculate the phase angle of the alternating-current voltage to be adjusted on the basis of the phase angle of the alternating-current voltage being currently measured and the frequency of the alternating-current voltage to be adjusted, and may apply the calculated phase angle $\phi$ to the phase of the above-mentioned reference voltage $m \cos(2\pi f+\phi)$ via a cosine function.

Thus, the phase of the output alternating-current voltage of the converter 100 is adjusted according to information on the phase of the alternating-current voltage included in the signal for the reference voltage.

Through the above-described process, the converter may output the alternating-current voltage having the adjusted magnitude and frequency of the voltage.

When the measured direct-current voltage of the entire system is equal to or less than the reference voltage, the converter 100 may control the magnitude of the output alternating-current voltage to be equal to or greater than the preset value again.

However, when the converter 100 outputs the alternating-current voltage greater than the preset value while outputting the output alternating-current voltage equal to the preset value, inrush current may be generated in the wind power generation farm 300 interconnected with the converter 100.

Here, the inrush current is a current that instantaneously flows and has an increased magnitude. The inrush current is well-known, and thus detailed description therefor will not be provided herein.

Thus, the converter 100 may perform an inrush current preventing control operation for preventing generation of the inrush current.

The inrush current preventing control operation of the converter 100 will be described with reference to FIG. 9.

Figure 9:
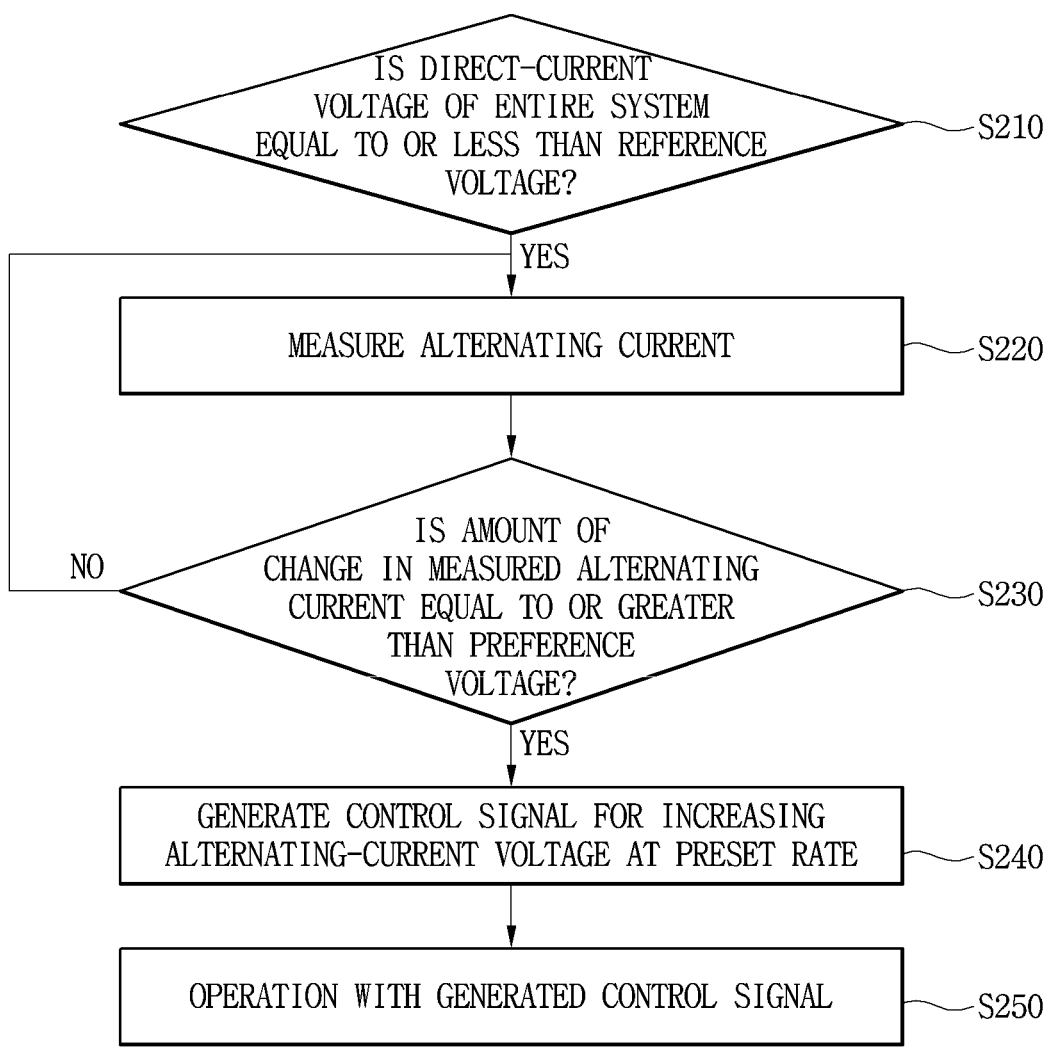
FIG. 9 is a flowchart showing an operating method of a converter according to another embodiment.
Figure 10:
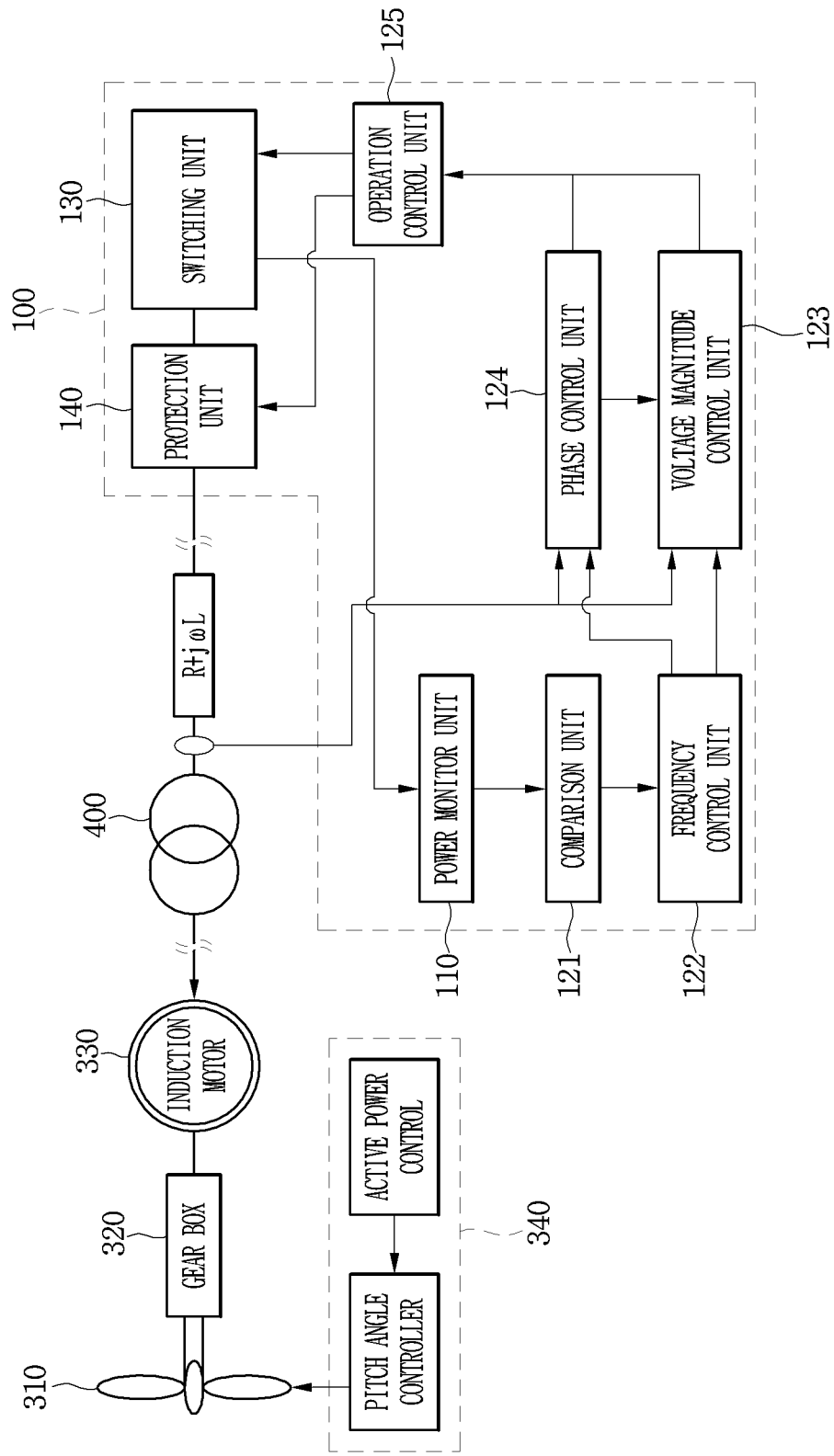
FIG. 10 is a flowchart showing an operation of a converter according to another embodiment.

FIG. 9 is a flowchart showing the inrush current preventing control of the converter 100.

Referring to FIG. 9, the power monitor unit 110 measures the direct-current voltage of an entire system interconnected with the converter 100.

The power monitor unit 110 transfers the measured direct-current voltage to the control unit 120.

The control unit 120 determines whether the measured direct-current voltage is equal to or less than the reference voltage (S210).

The comparison unit 121 of the control unit 120 may compare the measured direct-current voltage with the reference voltage and determine whether the measured direct-current voltage is included in the preset range of the reference voltage.

As a result, when it is determined that the measured direct-current voltage is included in the range of the reference voltage, the power monitor unit 110 measures an alternating current of an alternating-current system between the converter 100 and the wind power generation farm 300 (S220).

The power monitor unit 110 transfers the measured alternating current to the control unit 120.

The control unit 120 determines whether a variation in the measured alternating current is equal to or greater than a preset variation on the basis of the measured alternating current (S230).

The control unit 120 may calculate the measured variation in the alternating current and determine whether the calculated variation in the alternating current is equal to or greater than a preset variation.

When it is determined that the measured variation in the alternating current is equal to or greater than the preset variation, the control unit 120 generates a control signal for increasing the output alternating-current voltage of the converter 100 at a preset rate (S240).

The control unit 120 may adjust the magnitude of the output alternating-current voltage of the converter 100 and may perform control such that the magnitude of the output alternating-current voltage increases at a preset rate.

Specifically, the control unit 120 may adjust the magnitude of the output alternating-current voltage through the frequency control of the frequency control unit 122 and may perform control such that the frequency of the adjusted alternating-current voltage increases at a preset rate.

For example, the frequency control unit 122 may perform control such that the frequency control signal increases at a preset rate.

The converter 100 operates with the generated control signal (S250).

The control unit 120 may control an operation of the switching unit 150 on the basis of the control signal which is generated in operation S230 and by which the alternating-current voltage increases at a preset rate.

Specifically, the operation control unit 125 may control a switching operation of the switching unit 140 on the basis of the frequency control signal that is generated by the frequency control unit 122.

Thus, the switching unit 140 performs a switching operation, and the magnitude of the alternating-current voltage output by the converter 100 may increase at a preset rate.

Accordingly, it is possible to prevent the inrush current from being generated in the wind power generation farm 300 interconnected with the converter 100 since the magnitude of the alternating-current voltage output by the converter 100 increases at a preset rate.

According to an embodiment, it is possible to prevent shut-down of a wind power generation farm by enabling continuous power transmission even when a communication failure occurs in a direct current transmission apparatus interconnected with the wind power generation farm.

It is also possible to prevent generation of an inrush current in the direct current transmission apparatus interconnected with the wind power generation farm.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A converter interconnected with a wind power generation farm, the converter comprising:
   a power monitor configured to measure a direct-current voltage of a system interconnected with the converter;
   a controller configured to determine whether the measured direct-current voltage of the system is included in a preset range of a reference voltage and adjust an alternating-current voltage that is output to the wind power generation farm to a preset value, when it is determined that the measured direct-current voltage of the system is outside of the preset range of the reference voltage; and
   a switch configured to perform a switching operation to output the adjusted alternating-current voltage,
   wherein the adjusting of the alternating-current voltage to a preset value includes adjusting a frequency of the alternating-current voltage to a preset frequency value and adjusting a magnitude of the alternating-current voltage to a preset magnitude value, and
   wherein the controller is further configured to:
   control a magnitude of the alternating-current voltage to increase at a preset rate when it is determined that the measured direct-current voltage of the system is inside of the preset range of the reference voltage; and
   adjust the alternating-current voltage to the preset value to lower the frequency and the magnitude of the alternating-current voltage that is output to the wind power generation farm and reduce an amount of power generation of the wind power generation farm that is supplied with the adjusted alternating-current voltage when it is determined that the measured direct-current voltage of the system is outside of the preset range of the reference voltage.

2. The converter according to claim 1,
   wherein the power monitor measures an alternating current between the converter and the wind power generation farm, and
   wherein the controller determines whether a variation in the measured alternating current is equal to or greater than a preset variation.

3. The converter according to claim 2,
wherein the controller comprises a frequency controller configured to adjust the frequency of the alternating-current voltage to increase at a preset rate when it is determined that the variation in the measured alternating current is equal to or greater than the preset variation.

4. The converter according to claim 3,
wherein the controller comprises an operation controller configured to control the switching operation of the switch based on the frequency of the alternating-current voltage that increases at the preset rate.

5. The converter according to claim 1, further comprising a protector configured to block an overcurrent having a magnitude equal to or greater than a preset magnitude from flowing to the converter,
wherein the protector includes a resistor that limits a current value.

6. The converter according to claim 1, wherein the controller comprises:

a comparator configured to determine whether the measured direct-current voltage of the system is included in the preset range of the reference voltage;

a frequency controller configured to adjust the frequency of the alternating-current voltage to the preset frequency value;

a voltage magnitude controller configured to adjust the magnitude of the alternating-current voltage to a magnitude of the alternating-current voltage corresponding to the preset frequency value of the alternating-current voltage;

a phase controller configured to adjust a phase of the alternating-current voltage to a phase of the alternating-current voltage corresponding to the preset frequency value of the alternating-current voltage; and an operation controller configured to control the switch based on either the adjusted magnitude or the adjusted phase of the alternating-current voltage or both thereof.

* * * * *